United States Patent
Kim et al.

(10) Patent No.: US 11,824,209 B2
(45) Date of Patent: *Nov. 21, 2023

(54) POUCH-TYPE SECONDARY BATTERY AND BATTERY MODULE COMPRISING THE SAME

(71) Applicant: SK ON CO., LTD., Seoul (KR)

(72) Inventors: Tae Il Kim, Daejeon (KR); Jae Man Seo, Daejeon (KR); Jeong Sam Son, Daejeon (KR); Gyu Jin Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,894

(22) Filed: Nov. 29, 2022

(65) Prior Publication Data
US 2023/0090717 A1  Mar. 23, 2023

Related U.S. Application Data

(63) Continuation of application No. 16/885,819, filed on May 28, 2020, now Pat. No. 11,539,089.

(30) Foreign Application Priority Data

May 30, 2019 (KR) .......................... 10-2019-0063766

(51) Int. Cl.
*H01M 50/10* (2021.01)
*H01M 50/105* (2021.01)
(Continued)

(52) U.S. Cl.
CPC ......... *H01M 50/10* (2021.01); *H01M 50/105* (2021.01); *H01M 50/148* (2021.01); *H01M 50/20* (2021.01); *H01M 50/211* (2021.01)

(58) Field of Classification Search
CPC .. H01M 50/10; H01M 50/105; H01M 50/211; H01M 50/20; H01M 50/148
See application file for complete search history.

(56) References Cited

U.S. PATENT DOCUMENTS 11,539,089 B2 * 12/2022 Kim ...................... H01M 50/20
2009/0311581 A1 12/2009 Park et al.
(Continued)

FOREIGN PATENT DOCUMENTS

CN 101401229 B 6/2012
CN 103098256 A 5/2013
(Continued)

OTHER PUBLICATIONS

Extended European Search Report issued by the European Patent Office dated Oct. 19, 2020.
(Continued)

*Primary Examiner* — Jane J Rhee
(74) *Attorney, Agent, or Firm* — IP & T GROUP LLP

(57) ABSTRACT

A pouch-type secondary battery includes an electrode assembly; and a pouch member comprising an accommodating portion configured to accommodate the electrode assembly therein, a sealing portion formed at an edge of the accommodating portion, and an indent portion formed of a cutting edge cut at a plurality of angles and a rounded edge cut to connect the cutting edges adjacent to each other in a portion of the sealing portion corresponding to a vertex of the accommodating portion.

19 Claims, 3 Drawing Sheets

(51) Int. Cl.
*H01M 50/211* (2021.01)
*H01M 50/20* (2021.01)
*H01M 50/148* (2021.01)

(56) References Cited

U.S. PATENT DOCUMENTS

2011/0274955 A1* 11/2011 Park .................. H01M 50/105
    429/94
2013/0189570 A1    7/2013 Park et al.
2016/0380241 A1   12/2016 Yun

FOREIGN PATENT DOCUMENTS

| CN | 106299488 A | 1/2017 |
| KR | 10-2005-0036466 A | 4/2005 |
| KR | 10-2008-0022915 A | 3/2008 |
| KR | 10-0850865 B1 | 8/2008 |
| KR | 10-2016-0054268 A | 5/2016 |
| WO | 02/39516 A2 | 5/2002 |

OTHER PUBLICATIONS

Office Action issued for the Chinese Patent Application No. 202010469878.5 issued by the Chinese Patent Office dated Jun. 15, 2023.

* cited by examiner

POUCH-TYPE SECONDARY BATTERY AND BATTERY MODULE COMPRISING THE SAME

CROSS-REFERENCE TO RELATED APPLICATION(S)

This application is a continuation of U.S. patent application Ser. No. 16/885,819 filed on May 28, 2020, which claims benefit of priority to Korean Patent Application No. 10-2019-0063766 filed on May 30, 2019 in the Korean Intellectual Property Office, the disclosures of which are incorporated herein by reference in their entirety.

BACKGROUND

1. Field

The present disclosure relates to a pouch-type secondary battery and a battery module including the same.

2. Description of Related Art

With increased demand for mobile devices along with the development of related technologies, demand for a secondary battery as an energy source has rapidly increased. A secondary battery may be repeatedly charged and discharged as mutual conversion between chemical energy and electrical energy is reversible in a secondary battery. A pouch member of a secondary battery refers to a laminated film case for protecting a positive electrode, a negative electrode, a separation film, and an electrolyte solution, i.e., the main components of a secondary battery.

Such a pouch member has been used as a case of a lithium ion polymer battery or a dual-layer electrical capacitor. To use a secondary battery as a battery for a vehicle or a battery for an energy storage system, it has been necessary to secure long-term durability, durability sustained for 10 years or longer.

Meanwhile, as higher specifications are required for a high-capacity and high-power secondary battery, it has been necessary to develop a secondary battery able to implement high-energy density and high-performance cooling in accordance with the above-described requirements.

To satisfy such specifications, a measure of installing a secondary battery having high density has been considered; however, there may a problem arising in that the battery capacity may be relatively reduced in terms of the area occupied by the sealing portion in the case of a pouch-type secondary battery.

Accordingly, to address the above-described issues and limitations, research into a pouch-type secondary battery and a battery module including the same may be necessary.

SUMMARY

An aspect of the present disclosure is to provide a pouch-type secondary battery, in which the problem of battery capacity relatively reduced by an area occupied by a sealing portion is resolved and a battery module including the same.

According to an exemplary embodiment of the present disclosure, a pouch-type secondary battery may include an electrode assembly; and a pouch member comprising an accommodating portion configured to accommodate the electrode assembly therein, a sealing portion formed at an edge of the accommodating portion, and an indent portion formed of a cutting edge cut at a plurality of angles and a rounded edge cut to connect the cutting edges adjacent to each other in a portion of the sealing portion corresponding to a vertex of the accommodating portion.

The indent portion of the pouch-type secondary battery according to an exemplary embodiment may be formed adjacently to both sides of a lead tab portion of the electrode assembly externally exposed while being connected to the electrode assembly.

Specifically, the indent portion may include a first cutting edge formed to be inclined in a direction away from the lead tab portion; and a second cutting edge connected to the first cutting edge via the rounded edge and formed at a gentle angle of inclination as compared to an angle of inclination at which the first cutting edge is formed.

The first cutting edge of the indent portion according to an exemplary embodiment may have an angle of inclination of 10° to 50° with respect to one edge of the accommodating portion adjacent to the lead tab portion.

The second cutting edge of the indent portion may have an angle of inclination of 5° to 15° with respect to one edge of the accommodating portion adjacent to the lead tab portion.

Further, the pouch-type secondary battery according to an exemplary embodiment may have the first cutting edge formed closer to the lead tab portion and shorter as compared to the second cutting edge.

In the pouch member of the pouch-type secondary battery, when the lead tab portion is arranged adjacent to one edge of the accommodating portion and is offset to one side, a cutting edge of the indent portion formed in an area enlarged by the offset arrangement of the lead tab portion may be formed at a gentle angle of inclination as compared to a cutting edge of the indent portion formed in an area reduced by the offset arrangement of the lead tab portion.

In addition, the rounded edge of the pouch-type secondary battery may be formed to have a radius of curvature of 2 mm to 8 mm.

According to another exemplary embodiment of the present disclosure, a battery module may include the pouch-type secondary battery and a housing member accommodating a plurality of the pouch-type secondary batteries therein.

The indent portion of the battery module according to another exemplary embodiment is formed in a position corresponding to a protrusion portion provided in the housing member.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
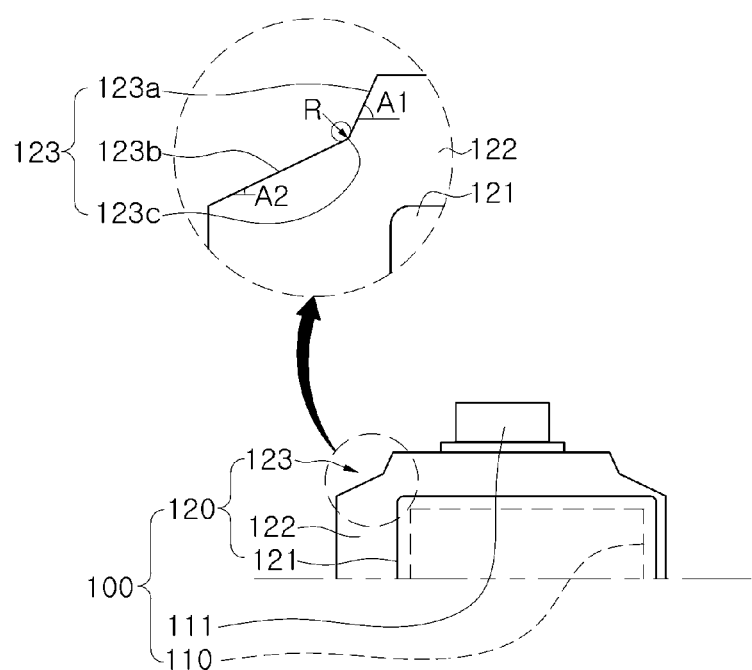
FIG. 1 is a planar view illustrating a portion adjacent to an indent portion in a pouch-type secondary battery of the present disclosure.

Hereinafter, example embodiments of the present disclosure will be described with reference to the accompanying drawings. The present disclosure is not limited to example embodiments, and it is to be understood that modifications can be made without departing from the spirit and scope of the present disclosure. Shapes and sizes of the elements in the drawings may be exaggerated for clarity of description.

In addition, an expression used in the singular encompasses the expression of the plural, unless it has a clearly different meaning in context. Identical or corresponding elements will be given the same reference numerals.

The present disclosure relates to a pouch-type secondary battery 100 and a battery module including the same. A problem of battery capacity relatively reduced by an area occupied by a sealing portion 122 in the pouch-type secondary battery 100 may be remedied.

In another aspect, the pouch-type secondary battery 100 and the battery module including the same in some exemplary embodiments may prevent folding of the sealing portion 122 by defining a shape and a size of cutting edges 123a and 123b forming an indent portion 123.

Meanwhile, in some exemplary embodiments, a pouch-type secondary battery 100 and a battery module including the same may prevent burring or cracking from occurring by defining a shape and a size of a rounded edge 123c when an indent portion 123 is formed.

Specifically, with reference to the drawings, FIG. 1 is a planar view illustrating a portion adjacent to an indent portion 123 in the pouch-type secondary battery of the present disclosure. Based on FIG. 1, the pouch-type secondary battery 100 may include an electrode assembly 110; and a pouch member 120 comprising an accommodating portion 121 configured to accommodate the electrode assembly 110 therein, a sealing portion 122 formed at an edge of the accommodating portion 121, and an indent portion 123 formed of cutting edges 123a and 123b cut at a plurality of angles and a rounded edge 123c cut to connect the cutting edges 123a and 123b adjacent to each other in a portion of the sealing portion 122 corresponding to a vertex of the accommodating portion 121.

As described above, the pouch-type secondary battery 100 includes the indent portion 123, and the indent portion 123 is formed of the first cutting edges 123a and 123b, and the rounded edge 123c formed between the first cutting edges 123a and 123b.

Accordingly, a problem in which an entire size of the pouch-type secondary battery 100 is reduced due to an insufficient installation space by a protrusion portion 210 formed to fasten inside the housing member 200, which may arise when the pouch-type secondary battery 100 is built in a housing member 200, or the like, of a battery module, may be remedied.

That is, in order to remedy the problem in which a maximum size of the pouch member 120 is reduced because the sealing portion 122 is caught by the protrusion portion 210, the indent portion 123 is formed in a portion corresponding to a position of the protrusion portion 210 to increase a size of the accommodating portion 121 of the pouch member 120, thereby increasing capacity of the electrode assembly 110.

In addition, the pouch member 120 of the present disclosure is formed with the rounded edge 123c between the cutting edges 123a and 123b in order to prevent a problem of occurrence of burring or cracking between the cutting edges 123a and 123b when forming the cutting edges 123a and 123b for formation of the indent portion 123.

The electrode assembly 110 may be configured as a secondary battery in which mutual conversion between chemical energy and electrical energy may be reversible such that the electrode assembly 110 may be repeatedly charged and discharged. The electrode assembly 110 may be implemented by a generally used secondary battery. For example, in the electrode assembly 110, a negative electrode and a positive electrode may be alternately stacked with a separation film interposed therebetween, and surfaces of the negative electrode and the positive electrode, coated with an electrode active material, may oppose each other.

The electrode assembly 110 may be substantially accommodated in the pouch member 120 together with an electrolyte solution. The electrolyte solution may include an organic solvent such as ethylene carbonate (EC), propylene carbonate (PC), diethyl carbonate (DEC), ethyl methyl carbonate (EMC), dimethyl carbonate (DMC), or the like, together with a lithium salt such as $LiPF_6$, $LiBF_4$, or the like. Further, the electrolyte solution may be liquid, solid, or gel-type.

The pouch member 120 may accommodate and protect the electrode assembly 110. To this end, the pouch member 120 may have a vessel form to provide an internal space in which the electrode assembly 110 and an electrolyte solution are accommodated. A portion of a lead tab portion 111 of the electrode assembly 110 may be externally exposed from the pouch member 120.

Such configured pouch-type secondary battery 100, as a nickel metal hydrogen (Ni-MH) battery, a lithium ion (Li-ion) battery, or the like, which may be charged and discharged, generates current. Further, a plurality of the pouch-type secondary batteries 100 may be stacked in the housing member 200.

In the pouch member 120, the sealing portion 121 may be disposed to seal an edge of the pouch member 120 in which the electrode assembly 110 is disposed, thereby protecting the electrode assembly 110.

The sealing portion 121 may be configured to protrude horizontally from all side surface of the pouch member 120, but may be configured to form an internal space followed by folding to seal three side surfaces, that is, in a three side-sealed form.

As described above, the pouch member 120 may include the accommodating portion 121, in which an internal space for accommodating the electrode assembly 110 is formed, and the sealing portion 122 formed around the accommodating portion 121 to seal the same.

In addition, the pouch member 120 includes the indent portion 123 in an area of the sealing portion 122 corresponding to a vertex of the accommodating portion 121. The indent portion can serve to prevent space loss by the protrusion portion 210 when mounted on the housing member 120, thereby enlarging the accommodating portion 121 for increased capacity of the electrode assembly 110.

The indent portion 123 may be formed of a plurality of cutting edges 123a and 123b cut at a plurality of angles and a rounded edge 123c between the cutting edges 123a and 123b.

Such cutting edges 123a and 123b and the rounded edge 123c may be formed by laser processing or by a one-press process using a die cutter. However, a method for manufacturing the indent portion 123 of the present disclosure is not limited thereto and may be any method as long as the indent portion 123 is formed as described above.

The indent portion 123 of the pouch-type secondary battery 100 according to an exemplary embodiment may be formed adjacently to both sides of a lead tab portion 111 of the electrode assembly 110 externally exposed while being connected to the electrode assembly 110.

In other words, the indent portion 123 is formed in a portion corresponding to the protrusion portion 210 for coupling to a housing, among the protrusion portion 210 of the housing member 200. Such protrusion portion 210 is mainly disposed close to both sides of the lead tab portion 111 when the pouch-type secondary battery 100 is built in the housing member 200, and thus, the indent portion 123 is formed close to both sides of the lead tab portion 111.

Specifically, the indent portion 123 of the pouch-type secondary battery 100 according to an exemplary embodiment may include a first cutting edge 123a formed to be inclined in a direction away from the lead tab portion 111 and a second cutting edge 123b connected to the first cutting edge 123a via the rounded edge 123c and formed at a gentle angle of inclination A2, as compared to an angle of inclination A1 at which the first cutting edge 123a is formed.

That is, the first cutting edge 123a adjacent to the lead tab portion 111 may be formed at a greater angle of inclination A1 than an angle of inclination at which the second cutting edge 123b disposed further away from the lead tab portion 111 than the first cutting edge 123a.

This is to secure an area of the indent portion 123 by cutting and removing a larger area from the sealing portion 122 when forming the indent portion 123 by cutting edges 123a and 123b.

Accordingly, a problem of a space limited by the indent portion 210 may be more effectively remedied.

In addition, the first cutting edge 123a of the pouch-type secondary battery 100 according to an exemplary embodiment may have an angle of inclination A1 of 10° to 50° with respect to one edge of the accommodating portion 121 adjacent to the lead tab portion 111.

In other words, a range of the angle of inclination A1 of the first cutting edge 123a formed closer to the lead tab portion 111 than the second cutting edge 123b is defined.

The angle of inclination A1 of the first cutting edge 123a is defined as 50° or less so that a portion around the sealing portion 122, in which the first cutting edge 123a is formed, is prevented from being folded by an external force.

The angle of inclination A1 of the first cutting edge 123a is defined as 10° or above to extend an area of the indent portion 123 formed by the first cutting edge 123a to be a significant area. That is, the angle is defined to form the indent portion 123 in an area in which interference with the protrusion portion 210 is avoided.

The second cutting edge 123b of the pouch-type secondary battery 100 according to an exemplary embodiment may be formed to have an angle of inclination A2 of 5° to 15° with respect to one edge of the accommodating portion 121 adjacent to the lead tab portion 111.

In other words, a range of the angle of inclination A2 of the second cutting edge 123b formed farther to the lead tab portion 111 than the first cutting edge 123a is defined.

The angle of inclination A2 of the second cutting edge 123b is defined as 15° or less to extend a portion of the indent portion 123 formed of the second cutting edge 123b together with the first cutting edge 123a be a significant area. That is, the angle is defined to form the indent portion 123 in an area in which interference with the protrusion portion 210 is avoided.

The angle of inclination A2 of the second cutting edge 123b is defined as 5° or above so that a portion around the sealing portion 122, in which the second cutting edge 123b is formed, is prevented from being folded by an external force.

Further, the rounded edge 123c of the pouch-type secondary battery 100 according to an exemplary embodiment may be formed to have a radius of curvature of 2 mm to 8 mm.

The rounded edge 123c is formed between the cutting edges 123a and 123b such that when the cutting edges 123a and 123b are formed for forming the indent portion 123, burring or cracking can be prevented from occurring between the cutting edges 123a and 123b.

The rounded edge 123c is defined as having a minimum radius of curvature of 2 mm to prevent burring or cracking from occurring.

The rounded edge 123c is defined as having a maximum radius of curvature of 8 mm to prevent the area of the indent portion 123 formed of the cutting edges 123a and 123b from being significantly reduced. That is, it is to extend the area of the indent portion to a significant region, and is a range allowing to form the indent portion, and is a range allowing the indent portion 123 to be formed in an area in which interference with the protrusion portion 210 is avoided.

Figure 2:
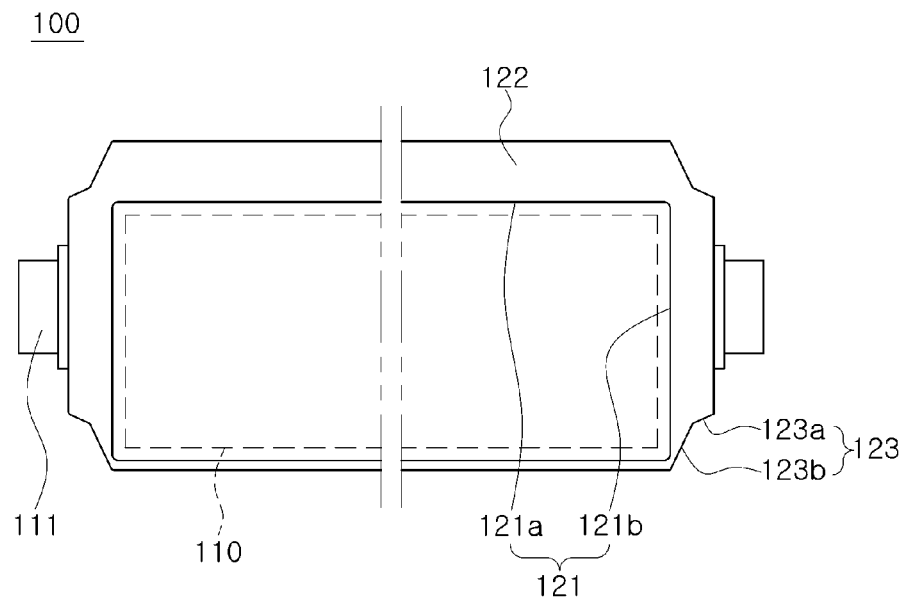
FIG. 2 is a planar view illustrating the pouch-type secondary battery of the present disclosure.

FIG. 2 is a planar view illustrating the pouch-type secondary battery of the present disclosure. Based on FIG. 2, a first cutting edge 123a of the pouch-type secondary battery 100 according to an exemplary embodiment, as compared to the second cutting edge 123b, is formed to be closer to the lead tab portion 111 and to be shorter.

As described above, relative lengths of the first and second cutting edges 123a and 123b are defined to maximize an area in which the indent portion 123 is formed.

As an example, in the case in which the lead tab portion 111 is formed adjacent to a shorter edge 121b of the accommodating portion 121, the first cutting edge 123a relatively close to the lead tab portion 111 is formed to be shorter than the second cutting edge 123b relatively far away from the lead tab portion 111 such that the indent portion 123 is formed in a widest area while not allowing any damage to be caused in the lead tab portion 111.

Alternately, in the case in the case in which the lead tab portion 111 is formed adjacent to a longer edge 121a of the accommodating portion 121, the first cutting edge 123a is formed to be longer than the second cutting edge 123b such that the area, in which the indent portion 123 is formed, is maximized.

Figure 3:
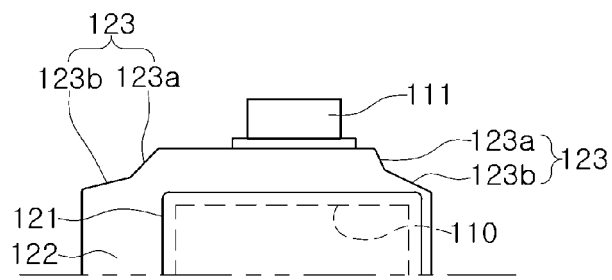
FIG. 3 is a planar view illustrating an exemplary embodiment in which a lead tab portion in the pouch-type secondary battery is offset.

FIG. 3 is a planar view illustrating an exemplary embodiment in which a lead tab portion in the pouch-type secondary battery is offset. Based on FIG. 3, in the pouch member 120 of the pouch-type secondary battery 100 according to an exemplary embodiment, when the lead tab portion 111 is arranged adjacent to one edge of the accommodating portion 121 and is offset to one side, the cutting edges 123a and 123b of the indent portion 123 formed in an area enlarged by the offset arrangement of the lead tab portion 111 is formed at a gentle angle of inclination as compared to the cutting edges 123a and 123b of the indent portion 123 formed in an area reduced by the offset arrangement of the lead tab portion 111.

In other words, when the lead tab portion 111 is arranged adjacent to one edge of the accommodating portion 121 and is offset to one side, angles of inclination of the cutting edges 123a and 123b formed in the area enlarged by the offset arrangement of the lead tab portion 111 and those in the area reduced are defined.

The cutting edges 123a and 123b formed in the area enlarged by the offset arrangement of the lead tab portion 111 have a gentle angle of inclination than those in the area reduced are defined. This is to prevent a portion around the sealing portion 122 from being folded by the indent portion 123 formed in the area of the sealing portion 122 enlarged by the offset arrangement of the lead tab portion 111.

In contrary thereto, the cutting edges 123a and 123b formed in the area reduced by the offset arrangement of the lead tab portion 111 are formed to have a steeper angle of inclination than those in the area enlarged reduced. This is to maximize the area, in which the indent portion 123 is formed, in the area of the sealing portion 122 reduced by the offset arrangement of the lead tab portion 111.

Figure 4:
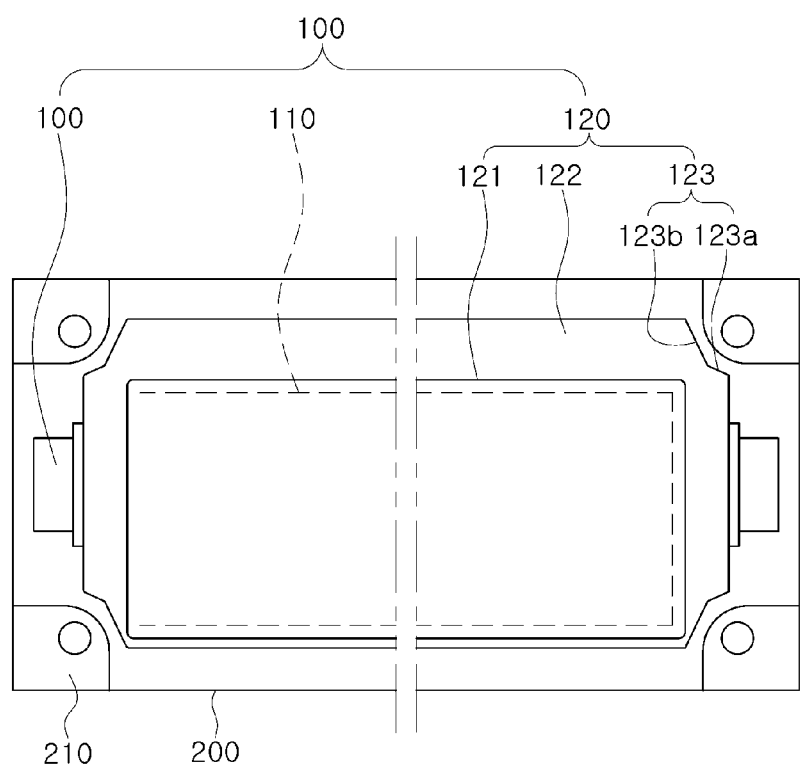
FIG. 4 is a planar view illustrating the pouch-type secondary battery and a battery module including the same.

FIG. 4 is a planar view illustrating the pouch-type secondary battery and a battery module including the same. Based on FIG. 4, a pouch-type secondary battery 100 of another example embodiment and a battery module including the same may include the pouch-type secondary battery 100 and a housing member 200 in which a plurality of the pouch-type secondary batteries 100 are accommodated.

The pouch-type secondary battery 100, by including the pouch member 120 formed in the previously described indent portion 1213, can enlarge an internal space of the accommodating portion 121 configured to accommodate the electrode assembly 110 while avoiding interference with the indent portion 210 formed in the housing member 200 when the pouch-type secondary battery 100 is mounted on the housing member 200.

That is, a problem in which an entire size of the pouch-type secondary battery 100 is reduced due to an insufficient installation space by the protrusion portion 210 formed to fasten inside the housing member 200, which may arise when the pouch-type secondary battery 100 is built in a housing member 200, or the like, of the battery module, may be remedied.

As the above, the indent portion 123 of the battery module according to another exemplary embodiment is formed in a position corresponding to the protrusion portion 210 provided in the housing member 200.

Accordingly, a problem in which a maximum size of the pouch member 120 is reduced as the sealing portion 122 is caught by the protrusion portion 210 can be remedied, and a size of the accommodating portion 121 of the pouch member 120 is increased to improve capacity of the electrode assembly 110.

According to the aforementioned example embodiments, the pouch-type secondary battery and the battery module including the same are advantageous in that the problem of battery capacity relatively reduced by the area occupied by the sealing portion in the secondary battery may be remedied.

In another aspect, the pouch-type secondary battery and the battery module including the same is advantageous in some exemplary embodiments in that the sealing portion adjacent to the indent portion may be prevented from being folded.

Meanwhile, the pouch-type secondary battery and the battery module including the same in some exemplary embodiments are advantageous in that problems of burring or cracking can be prevented from occurring when the indent portion is formed.

Various advantages and beneficial effects of the present disclosure are not limited to the above descriptions and may be easily understood in the course of describing the specific embodiments of the present disclosure.

While the example embodiments have been shown and described above, it will be apparent to those skilled in the art that modifications and variations could be made without departing from the scope of the present invention as defined by the appended claims.

What is claimed is:

1. A pouch-type secondary battery comprising:
   an electrode assembly; and
   a pouch member comprising an accommodating portion configured to accommodate the electrode assembly therein, and a sealing portion formed at outer edges of the pouch member adjacent to the accommodating portion,
   wherein the sealing portion includes at least one indent portion adjacent to a corner of the accommodating portion,
   wherein the at least one indent portion includes a first cutting edge and a second cutting edge extending from the first cutting edges,
   wherein the first cutting edge, as compared to the second cutting edge, is formed to be closer to the lead tap portion and is shorter.

2. The pouch-type secondary battery of claim 1, wherein the at least one indent portion is formed adjacently to one sides of a lead tab portion of the pouch-type secondary battery, wherein the lead tab portion is externally exposed and is connected to the electrode assembly.

3. The pouch-type secondary battery of claim 2, wherein the first cutting edge is inclined in a direction away from the lead tab portion; and
   the second cutting edge is formed at a gentle angle of inclination, as compared to an angle of inclination at which the first cutting edge is formed.

4. The pouch-type secondary battery of claim 3, wherein the first cutting edge has an angle of inclination of 10° to 50° with respect to an edge of the accommodating portion adjacent to the lead tab portion.

5. The pouch-type secondary battery of claim 3, wherein the second cutting edge has an angle of inclination of 5° to 15° with respect to an edge of the accommodating portion adjacent to the lead tab portion.

6. The pouch-type secondary battery of claim 3, wherein the first cutting edge is cut at a first cutting edge angle, and the second cutting edge is cut at a second cutting edge angle.

7. The pouch-type secondary battery of claim 2, wherein, in the pouch member, when the lead tab portion is arranged adjacent to one edge of the accommodating portion and is offset to one side, a cutting edge of the at least one indent portion formed in an area enlarged by the offset arrangement of the lead tab portion is formed at a gentle angle of inclination as compared to a cutting edge of the at least one indent portion formed in an area reduced by the offset arrangement of lead tab tap portion.

8. The pouch-type secondary battery of claim 1, wherein the at least one indent portion further includes a rounded edge connecting the first and second cutting edges.

9. The pouch-type secondary battery of claim 8, wherein the rounded edge is formed to have a radius of curvature of 2 mm to 8 mm.

10. A battery module, comprising:
    the pouch-type secondary battery of claim 1; and
    a housing member accommodating a plurality of the pouch-type secondary batteries therein, and
    wherein the at least one indent portion is formed in a position corresponding to a protrusion portion provided in the housing member.

11. The battery module of claim 10, wherein the housing member includes four protrusion portions at four corners thereof, and the pouch-type secondary battery includes four indent portions formed in respective positions corresponding to the protrusion portions.

12. The pouch-type secondary battery of claim 1, wherein the pouch member has three sealed sides and one non-sealed side.

13. A secondary battery comprising:
an electrode assembly;
a pouch member including an accommodating portion for accommodating the electrode assembly therein, a sealing portion at outer edges of the pouch member forming three sealed sides which extend laterally from the accommodating portion, and a non-sealed side extending substantially in parallel to one side of the electrode assembly;
a lead tab portion extending through each of two opposite sealed sides of the pouch member;
wherein the electrode assembly is arranged so as to be biased toward the non-sealed side of the pouch member.

14. The secondary battery of claim 13, wherein the sealing portion includes at least one indent portion adjacent to a corner the accommodating reducing the area occupied by the sealing portion,
wherein the includes at least one indent portion includes a first cutting edge, a second cutting edge and a rounded edge connecting the first and second cutting edges, and
wherein the first cutting edge, as compared to the second cutting edge, is formed closer to the lead tap portion and is shorter.

15. The secondary battery of claim 14, wherein the first cutting edge is cut at a first cutting edge angle, and the second cutting edge is cut at a second cutting edge angle.

16. The secondary battery of claim 15, wherein the first cutting edge is inclined in a direction away from an adjacent lead tab portion; and
the second cutting edge is formed at a less sharp angle of inclination, as compared to an angle of inclination at which the first cutting edge is formed.

17. The secondary battery of claim 16, wherein the first cutting edge has an angle of inclination of 10° to 50° with respect to one edge of the accommodating portion adjacent to the adjacent lead tab portion, and
wherein the second cutting edge has an angle of inclination of 5° to 15° with respect to one edge of the accommodating portion adjacent to the adjacent lead tab portion.

18. The secondary battery of claim 16, wherein the first cutting edge, as compared to the second cutting edge, is formed to be closer to the adjacent lead tap portion and is shorter.

19. The pouch-type secondary battery of claim 14, wherein the rounded edge is formed to have a radius of curvature of 2 mm to 8 mm.

* * * * *